United States Patent Office 2,844,393
Patented July 22, 1958

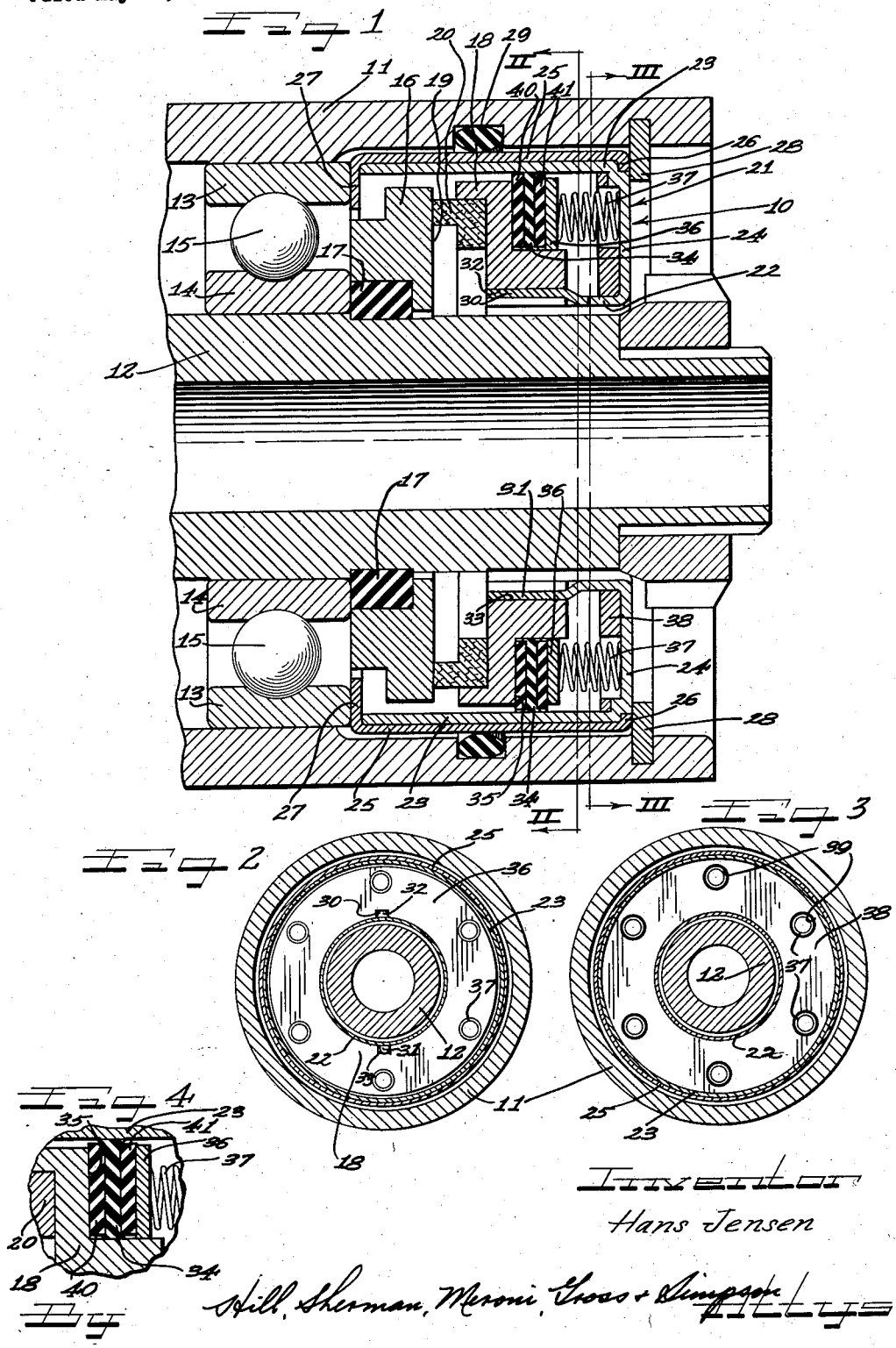

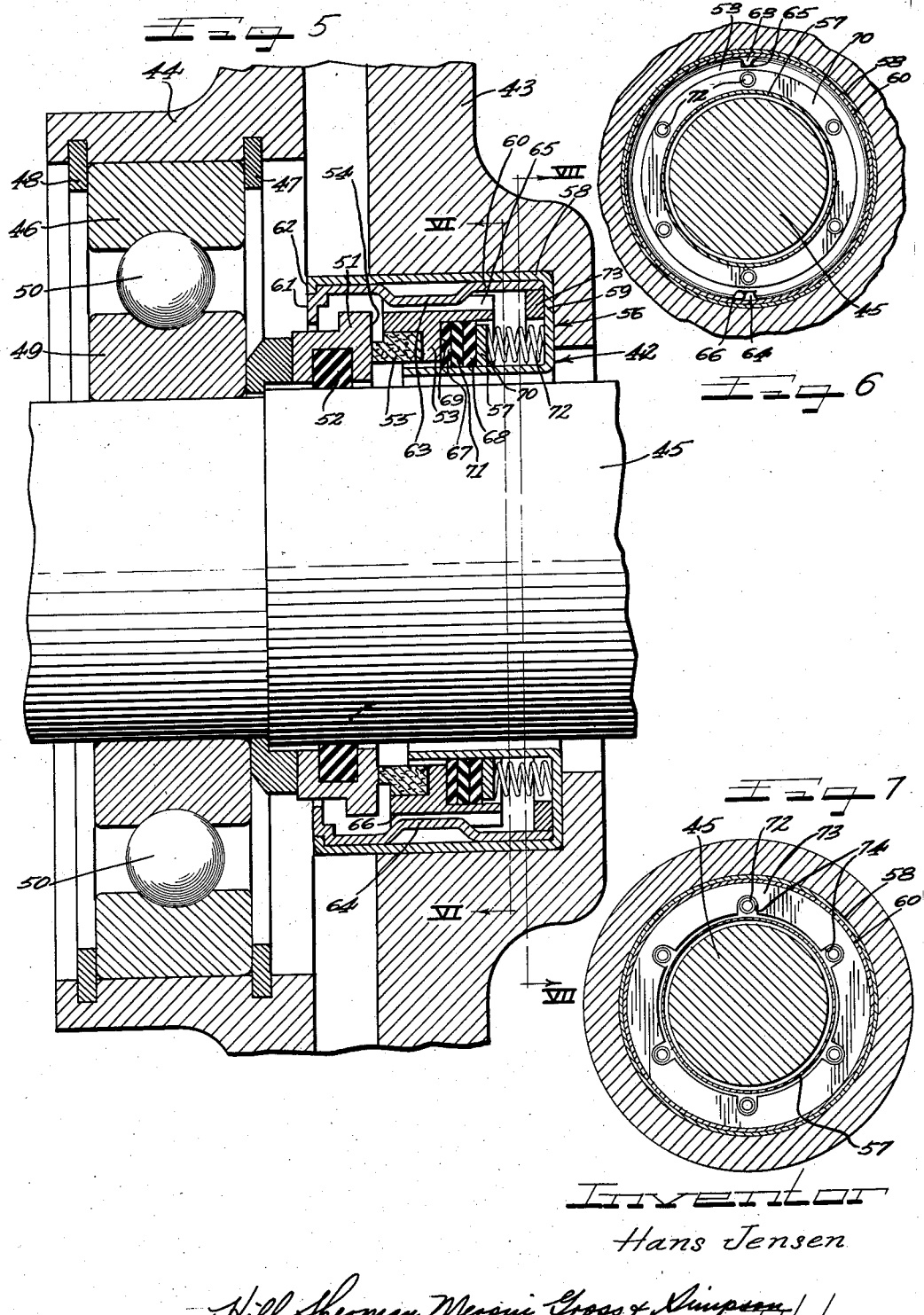

2,844,393

SHAFT SEAL WITH RADIALLY COMPACTING SEALING SURFACES

Hans Jensen, Chicago, Ill., assignor to Gits Bros. Mfg. Co., a corporation of Illinois Application May 12, 1954, Serial No. 429,157

2 Claims. (Cl. 286—11.14)

This invention relates to a shaft seal and more particularly to a seal between a wall or the like and a rotatable shaft extending through the wall with the seal acting to prevent flow of pressurized fluid from one side of the wall to the other.

This invention may preferably be applied to a shaft seal arrangement in which the wall and the shaft extending therethrough carry members defining annular surfaces sealingly engaged in a plane transverse to the shaft axis. Such surfaces may be urged into pressure engagement by biasing the shaft axially relative to the housing but preferably, the member carried by the wall and defining one of the surfaces is movable relative to the wall in a dirction parallel to the shaft axis and resilient means act between such member and the wall to urge the surface of the member into pressure engagement with the surface of the member carried by the shaft.

It is therefore necessary to provide a seal allowing movement of such member relative to the wall in a direction axially of the shaft. Heretofore, such seal has been provided by a ring-shaped resilient member having the cross-sectional shape of an O, chevron, bellows or wedge. Such a sealing member has not been entirely satisfactory because any materials used for such a member have limitations due to the deformation from the original shape or deterioration arising from high or low temperatures, high pressures, or lack of resistance to particular liquids or gases etc.

According to this invention, a seal is provided utilizing a resilient member but in such a manner that limitations of the material of the member as to high or low temperatures, high pressures, or lack of resistance to particular liquids or gases, etc., do not effect the efficiency of the seal.

According to an important feature of the invention, a shaft seal is provided utilizing a resilient deformable member acting to provide a seal but so confined that the effect of high or low temperatures, high pressures, or particular liquids or gases used in conjunction with the device, is obviated.

According to a further important feature of the invention, a shaft seal utilizes a resilient member which is subjected to a squeezing action urging a surface of the member into sealing engagement with another surface, so as to obviate the effect of deformation or deterioration arising from high or low temperatures, high pressures, or particular liquids or gases used in conjunction with the device.

In accordance with a specific feature of the invention, a sealing member of deformable material may be confined between a pair of members urged toward each other to exert squeezing forces on the sealing member, such pair of members thus acting to both confine and squeeze the sealing member.

According to a further feature of the invention, a sealing member of relatively highly deformable material, which may be subject to permanent deformation and deterioration with the pressures, temperatures and liquids or gases used with the device, is confined between members of resilient, less deformable material capable of withstanding the pressures, temperatures and liquids or gases used with the device, and such pair of members may be disposed between a pair of members of relatively rigid material urged toward each other to exert a squeezing action on such pair of resilient members and on the member of relatively highly deformable material therebetween.

If desired, a plurality of such members of relatively highly deformable material may be utilized, each such member being preferably sandwiched between a pair of members of less deformable but resilient material.

According to a still further feature of the invention, spring means are provided which not only exert a squeezing action on the deformable sealing member but also serve to urge the relatively rotatable, sealingly engageable annular surfaces into pressure engagement. Thus the spring means performs a dual function.

It may be noted that the members of deformable material of this invention may most preferably be in the form of washers or the like of annular configuration, for ease of formation thereof, ease of construction of the parts cooperating therewith in more efficient and reliable operation.

Still another feature of the invention is in the manner in which the parts of the shaft seal device are formed and assembled to provide a compact device easily and economically manufacturable and readily installed. According to this feature, a support member is provided having inner and outer coaxial radially spaced cylindrical walls integrally joined by a radially extending annular wall between adjacent ends of the cylindrical walls, and a ring is disposed between such cylindrical walls. The ring may carry means defining one of the relatively rotatable sealingly engageable annular surfaces. One or more of the sealing washers of deformable material of this invention may be disposed between the ring and either the inner wall or the outer wall of the support member. A washer of rigid material may be disposed between the deformable washer and the annular wall of the support member, and means are provided for urging such rigid washer toward the ring to squeeze the deformable washer therebetween, such means preferably taking the form of springs confined between the rigid washer and the annular wall of the support member. Such springs may thereby also serve to urge the relatively rotatable sealingly engageable annular surfaces into pressure engagement.

It will be apparent that with this arrangement, the shaft seal device may be in the form of a cartridge readily assembled and installed.

In one preferred embodiment of the invention, a connection between the outer wall and the ring confined between the inner and outer walls of the support member is provided for locking such ring against rotation relative to the support member while permitting relative axial movement thereof, and the washer of deformable material is carried by such ring and is engageable with the outer cylindrical surface of the inner wall. Such connection between the ring and the outer wall may most preferably be provided by at least one radially inwardly deformed portion of the outer wall engaged in an axially extending groove or key-way in the ring.

In another preferred embodiment, the connection between the ring and the support member may be between the ring and the inner wall of the support member with the washer of deformable material engaged with the inner surface of the outer wall of the support member.

An object of this invention, accordingly, is to provide a seal utilizing a deformable member in such a manner that limitations of the material of the member as to permanent deformation and deterioration from high or low temperatures, high pressures, or particular liquids or gases, do not affect the efficiency of the seal.

Another object of this invention is to provide an improved seal particularly arranged for use in a shaft seal assembly.

A further object of this invention is to provide an improved shaft seal device which is compact, readily and economically manufacturable, reliable, efficient and durable.

This invention contemplates other and more specific objects, features and advantages which will become more fully apparent from the following detailed description taken in conjunction with the accompanying drawings which illustrate preferred embodiments and in which:

Figure 1 is a cross-sectional view through one preferred form of shaft seal assembly constructed in accordance with the principles of this invention;

Figure 2 is a sectional view on a reduced scale, taken substantially along lines II—II of Figure 1;

Figure 3 is a sectional view on a reduced scale taken substantially along lines III—III of Figure 1;

Figure 4 is a detail view on a slightly enlarged scale illustrating the form of sealing action achieved with the deformable members in accordance with this invention;

Figure 5 is a sectional view through another preferred form of shaft seal assembly constructed according to the principles of this invention;

Figure 6 is a sectional view, on a reduced scale, taken substantially along line VI—VI of Figure 5; and Figure 7 is a sectional view taken substantially along line VII—VII of Figure 5.

Reference numeral 10 generally designates a seal assembly constructed according to the principles of this invention and arranged to provide a seal between a wall or the like 11 and a shaft 12 extending through the wall 11 and rotatably supported therefrom by means such as a ball bearing assembly including an outer bearing ring 13 affixed within the wall 11, an inner bearing ring 14 affixed on the shaft 12 and a plurality of balls 15 confined between the bearing rings 13 and 14.

The seal assembly 10 may comprise a ring member 16 carried by the shaft 12 preferably through an annular sealing ring 17 of a suitable resilient or elastomeric material such as rubber or plastic, and a ring member 18 carried by the wall 11 through means to be described more in detail hereinafter. The rings 16 and 18 may carry means defining relatively rotatable sealingly engageable annular surfaces and for this purpose, the ring 16 has a machine-finished annular radial end face 19 in a plane transverse to the axis of the shaft 12, and the ring 18 carries an abutment ring 20 engaged with the face 19. The abutment ring 20 may preferably be composed of a lubricating and sealing material such as carbon or the like and may be fixedly held against rotation relative to the ring 18 by any suitable means.

For support of the ring 18 from the wall 11, a support member 21 is provided which may have an inner sleeve-like cylindrical wall 22, an outer coaxial cylindrical wall 23 and an integral radially extending annular wall 24 between adjacent ends of the walls 22 and 23. The ring 18 has at least a portion between the cylindrical walls 22 and 23 and the ring 16 may preferably be within a portion of the outer wall 23 projecting beyond the inner wall 22. Removal of the ring 16 from assembly within the support member 21 may be prevented by means of a sleeve member 25 receiving the member 21, the sleeve member 25 having an inturned flange 26 at one end thereof to lock the same to the support member 21 and having an inturned annular flange 27 at the other end thereof in facing relation to a portion of the ring 16 to prevent displacement thereof from assembly within the support member 21. Thus an integral assembly in the form of a cartridge is provided.

The support member 21 of the seal assembly 10 may be secured to the wall 11 between the outer ring 13 of the bearing assembly and a retaining ring 28. To provide a seal, a ring 29 of a resilient or elastomeric material such as rubber or plastic may be disposed about the sleeve 25 within a suitable slot in the wall 11.

The ring 18 is preferably so supported by the support member 21 as to prevent relative rotation therebetween but to permit relative axial movement. For this purpose, the inner cylindrical wall 22 of the support member 21 may have a pair of portions 30 and 31 deformed outwardly and engaged in axially extending grooves 32 and 33, respectively, in the inner surface of the ring 18.

An important feature of the present invention is in the provision of a seal including a deformable member 34 between the ring 18 and the support member 21 which seal is effective despite limitations of the material of the member 34 as to deformation and deterioration at high or low temperatures, high pressures, or from liquids or gases used in conjunction with the device.

According to this invention, the deformable member 34, which may preferably be in the form of a washer, is confined and is subjected to squeezing forces acting in a direction parallel to the axis of the shaft 12 to force its outer peripheral edge into pressure contact with the inner surface of the cylindrical wall 23 of the support member 21. For these purposes, the member 34 may be disposed between an annular radial end face 35 of the ring 18 and the washer 36 of relatively rigid material which washer may be urged toward the end face 35 by a plurality of coiled compression springs 37 acting between the washer 36 and the end wall 24 of the support member 21. The positions of the springs 37 may be fixed by a guide washer 38 disposed against the inner surface of the wall 24 and having a plurality of circumferentially spaced openings 39 receiving the ends of the springs 37. It will be noted that the springs 37, in addition to imparting a squeezing action on the deformable sealing washer member 34, also serve to urge the surfaces of the seal ring 12 into pressure engagement with the surface 19 of the ring 16.

According to a specific feature of the invention, the deformable member 34 may be disposed between a pair of resilient members 40 and 41, preferably in the form of washers, which are, in turn, disposed between the face 35 of the ring 18 and the washer 36. The resilient members 40 and 41 serve to more completely confine the deformable member 34 and also serve to more uniformly transmit the squeezing forces to the member 34.

The member 34 may be a solid elastomeric (deformable) resinous body of heat resistance and corrosion resistant material such as organosilicones, tetrafluoroethylene alkyds which may be filled with particulate refractory filler such as carbon, silica flour, etc. The members 40 and 41 may be made of the same materials reinforced or stiffened by refractory fibrous fillers such as asbestos, glass fibers, etc. to substantially remove (mass) deformation characteristics but to retain resiliency.

The members 40 and 41, and particularly the member at the side subjected to pressurized, high, or low temperature liquids or gases, should be resistant to such pressurized, high or low temperature liquids or gases, but the deformable member 34 need not be so resistant because of the fact that it is confined and because of the fact that a certain amount of deformation thereof is desirable to maintain sealing engagement with the inner surface of the wall 23.

The manner in which the member 34 may be deformed by squeezing forces into pressure sealing engagement with the wall 23 is illustrated in detail in Figure 4.

If desired, additional readily deformable sealing members like the member 34 may be disposed between the face 35 of the ring 18 and the washer 36. Preferably, members of resilient, less deformable material like the members 40 and 41 are disposed between such readily deformable members and at the ends of the stack of such members, particularly at the end subjected to the pressurized, high or low temperature liquids or gases used with the device.

It will be apparent that the seal assembly 10 is very compact, readily and economically manufacturable, and easily installed while being highly efficient, reliable and durable. It may also be noted that while the seal assembly including the deformable member 34 is especially advantageous in the particular assembly illustrated, it will be apparent that this seal assembly has wide application wherever a similar seal is needed and particularly where the seal is subjected to pressurized, high or low temperature liquids or gases.

Referring now to Figures 5–7, reference numeral 42 generally designates another preferred form of seal assembly constructed according to the principles of this invention and arranged to provide a seal between a wall or the like including wall members 43 and 44 and a shaft 45 extending through the wall members 43 and 44 and rotatably supported therefrom by means such as a ball bearing assembly including an outer bearing ring 46 affixed within the wall member 44 by retaining rings 47 and 48, an inner bearing ring 49 affixed to the shaft 45 and a plurality of balls 50 confined between the rings 46 and 49.

The seal assembly 42 may comprise a ring member 51 carried by the shaft 45 through an annular sealing ring 52 of a suitable resilient or elastomeric material such as rubber or plastic and a ring 53 carried by the wall member 43 by means to be described in detail hereinafter. The rings 51 and 53 have means defining relatively rotatable seemingly engageable annular surfaces. For this purpose, the ring 51 may have an annular radial end face 54 in a plane transverse to the axis of the shaft 45 and the ring 53 may carry an abutment ring 55 having an annular radial end face engageable with the face 54, the abutment ring 55 being preferably composed of a sealing, lubricating material such as carbon or the like.

To carry the ring 53 from the wall member 43, a support member 56 is provided having an inner cylindrical sleeve-like wall 57, an outer cylindrical wall 58 and an integral radially extending annular wall 59 between adjacent ends of the cylindrical walls 57 and 58.

The ring 53 may be disposed between the cylindrical walls 57 and 58 and the outer wall 58 may have a portion extending beyond the end of the wall 57 and disposed outside at least a portion of the ring 51.

Removal of the ring 51 from assembly within the support member 56 may be prevented by means of a sleeve member 60 having an in-turned integral annular flange 61 in facing relation to a portion of the ring 51. The sleeve 60 may be locked within the support member 56 by an inturned flange portion 62 of the cylindrical wall 58.

The sleeve 60 may have diametrically opposed inwardly deformed portions 63 and 64 engaged in axially extending slots 65 and 66, respectively, in the ring 53 to lock the ring 53 against rotation relative to the support member 56 while allowing relative axial movement thereof.

According to this invention, a seal may be provided between the ring 53 and the support member 56 which may preferably comprise a pair of resilient members 67 and 68 in the form of washers disposed between an annular radial face portion 69 of the ring 53 and a washer 70 wtih a deformable member 71 in the form of a washer disposed between the resilient members 67 and 68. The washers 67 and 68 may be like the washers 40 and 41 and the deformable washer 71 may be like the washer member 34, such washers 34, 40 and 41 being described in detail above in connection with the seal assembly 10.

The washer 70 is urged toward the face 69 of the ring 53 by a plurality of circumferentially spaced coiled compression springs 72 acting between the wall 59 of the support member 56 and the washer 70. To fix the position of the springs 72, a guide ring 73 may be disposed against the inner face of the wall 59 and may have a plurality of circumferentially spaced slots 74 receiving the ends of the springs 72.

The springs 72 serve the dual function of imparting a squeezing action on the deformable member 71 and of forcing the abutment ring 55 into pressure sealing engagement with the base 54 of the ring 51. The coaction between the members 67, 68 and 71, and the inner cylindrical wall 57 of the support member 56 is, of course, the same as the coaction between the resilient members 34, 40 and 41 and the outer cylindrical wall 23 of the support member 21 in the assembly 10 described in detail above.

It will be apparent that the seal assembly 42 is very compact, readily and economically manufacturable, while being efficient, reliable and durable.

It will be understood that modifications and variations may be effected without departing from the spirit and scope of the novel concepts of the present invention.

I claim as my invention:

1. A shaft seal including a pair of coaxial rings having means defining relatively rotatable sealingly engageable annular surfaces, a support member for carrying one of said rings and including a cylindrical wall and a radially extending wall, a radial rigid surface on said one ring axially facing said radial wall of the support member and a cylindrical surface facing said cylindrical wall of the support member, and means for providing a fluid seal between said support and said one ring for allowing axial movement of said ring relative to said cylindrical wall to maintain said annular surfaces in pressure engagement, comprising first and second annular washers of heat-resistant resiliently deformable material having annular edge portions adjacent said cylindrical wall of said support member and opposite annular edge portions adjacent said cylindrical surface of said one ring, a third annular washer of relatively highly deformable material between said first and second washers and having an annular edge portion sealingly engaged with said cylindrical wall and an opposite annular edge portion sealingly engaged with said cylindrical surface, a fourth washer of rigid material in axial facing relation to said second washer, said first washer axially facing said radial surface of said one ring, and spring means acting between said radially extending wall of said support and said fourth washer for squeezing said first, second and third washers between the rigid fourth washer and said rigid radial surface on said one ring for exerting squeezing forces on said first and second washers whereby the resilient washers will evenly transmit axial pressure to the third washer between them and force the edges thereof into pressure engagement with said cylindrical wall and cylindrical surface.

2. A shaft seal including a pair of coaxial rings having means defining relatively rotatable sealingly engageable annular surfaces, a support member for carrying said one ring and including a cylindrical wall, a backing member, a radial rigid surface on said one ring axially facing said backing member and a cylindrical surface facing said cylindrical wall of the support member, and means for providing a fluid seal between said support and said one ring for allowing axial movement of said ring relative to said cylindrical wall to maintain said annular surfaces in pressure engagement, comprising first and second annular washers of heat-resistant resiliently deformable material having annular edge portions adjacent said cylindrical wall of said support member and opposite annular edge portions adjacent said cylindrical surface of said one ring, a third annular washer of relatively highly deformable material between said first and second washers and having an annular edge portion sealingly engaged with said cylindrical wall and an opposite annular edge portion sealingly engaged with said cylindrical surface, a pressure member having a circumferentially disposed surface in axial facing relation to said second washer, said first washer axially facing said radial surface of said one ring, and spring means acting between said backing member and said pressure member for squeezing said first, second and third washers between the pressure member and said rigid radial surface on said one ring for exerting squeezing forces on said first and second washers whereby the resilient washers will evenly transmit axial pressure to the third washer between them and force the edges thereof into pressure engagement with said cylindrical wall and cylindrical surface.

References Cited in the file of this patent

UNITED STATES PATENTS

| | | |
|---|---|---|
| 524,162 | Cochrane | Aug. 7, 1894 |
| 906,199 | Coleman | Dec. 8, 1908 |
| 2,023,898 | Olson | Dec. 10, 1935 |
| 2,037,144 | Olson | Apr. 14, 1936 |
| 2,049,955 | Gilbert | Aug. 4, 1936 |
| 2,363,110 | Krug | Nov. 21, 1944 |
| 2,365,046 | Bottomley | Dec. 12, 1944 |
| 2,504,937 | Payne | Apr. 18, 1950 |
| 2,561,132 | Payne | July 17, 1951 |
| 2,679,412 | Whitfield | May 25, 1954 |

FOREIGN PATENTS

| | | |
|---|---|---|
| 511,217 | Germany | Oct. 29, 1930 |